(12) United States Patent
Qi et al.

(10) Patent No.: US 8,649,733 B2
(45) Date of Patent: Feb. 11, 2014

(54) SYSTEM AND METHOD FOR QUICK AUTHENTICATION BETWEEN BLUETOOTH DEVICES

(75) Inventors: Xuliang Qi, Shenzhen (CN); Xin Zhang, Shenzhen (CN); Rennai Xie, Shenzhen (CN); Yi Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 18 days.

(21) Appl. No.: 13/394,988

(22) PCT Filed: Jun. 9, 2010

(86) PCT No.: PCT/CN2010/073728
§ 371 (c)(1),
(2), (4) Date: Mar. 8, 2012

(87) PCT Pub. No.: WO2011/032399
PCT Pub. Date: Mar. 24, 2011

(65) Prior Publication Data
US 2012/0171961 A1 Jul. 5, 2012

(30) Foreign Application Priority Data
Sep. 16, 2009 (CN) .......................... 2009 1 0171892

(51) Int. Cl.
*H04B 7/00* (2006.01)
(52) U.S. Cl.
USPC .................... 455/41.2; 455/456.3; 455/456.1; 455/522; 370/337; 370/349; 379/202.01
(58) Field of Classification Search
USPC ........... 455/41.2, 456.3, 456.1, 522; 370/337, 370/349; 379/202.01
See application file for complete search history.

(56) References Cited

U.S. PATENT DOCUMENTS

| 7,254,123 | B2 * | 8/2007 | Jukarainen | 370/337 |
| 2004/0192207 | A1 * | 9/2004 | Ketola | 455/41.2 |
| 2009/0131079 | A1 * | 5/2009 | Sekhar | 455/456.3 |
| 2011/0021143 | A1 * | 1/2011 | Kapur et al. | 455/41.2 |

OTHER PUBLICATIONS

Li Wenjuan et al Study on several trust models in grid environment, Journal of Fuzhou University(Natural Science Edition).
Liu Zhanmin Discuss of Security of Bluetooth technique, Science & Technology Progress and Policy.
Zhou Liya et al Bluetooth Scatter Net Construction Algorithm Based on Capabilities of Device.
International Search Report for PCT/CN2010/073728 dated Sep. 6, 2010.

* cited by examiner

*Primary Examiner* — April G Gonzales
(74) *Attorney, Agent, or Firm* — Ling Wu; Stephen Yang; Ling and Yang Intellectual Property

(57) ABSTRACT

A system and method for quick authentication between Bluetooth devices are disclosed. The method includes: adding a central node (11) in a trusted environment (10, 13) of a Bluetooth device, wherein, said control node makes authentication with each trusted device (12) in the trusted environment and stores an information list containing information of each trusted device; after the information of a trusted device in the trusted environment is updated, the central node sends synchronization information to the trusted device that needs to update the synchronization information, and the trusted device receiving the synchronization information implements the update of the synchronization information.

15 Claims, 5 Drawing Sheets

SYSTEM AND METHOD FOR QUICK AUTHENTICATION BETWEEN BLUETOOTH DEVICES

TECHNICAL FIELD

The present invention relates to Bluetooth wireless communications, and more especially, to a system and method for quick authentication between Bluetooth devices.

BACKGROUND OF THE RELATED ART

The most widely used method for achieving the security of the Bluetooth wireless communication is implemented with a necessary authentication process, that is, before two sides of the communication acquire each other's trust, the two sides must negotiate a common key, and authentication is performed in an initial authentication process. When this method is used in the fixed communication network, an exponential pairing process is needed when a plurality of Bluetooth devices communicate with each other, which is very inconvenient. In view of this, when a Bluetooth wireless communication network is established within a trusted environment, the common practice now is to simplify the authentication process, for example, presetting a shared key within an organization. But this method degrades the security at the same time of improving the convenience.

CONTENT OF THE INVENTION

The technical problem to be solved in the present invention is to provide a system and method for quick authentication between Bluetooth devices, to achieve the quick authentication of Bluetooth trusted group devices and guarantee the security between the devices.

In order to solve the aforementioned technical problem, the present invention provides a method for quick authentication between Bluetooth devices, comprising:

adding a central node in a trusted environment of Bluetooth devices, wherein, authentication is completed between the central node and each trusted device in the trusted environment and the central node stores an information list including information of each trusted device, when the information of the trusted device in the trusted environment is updated, the central node needs to send synchronization information to the trusted device which needs to update the synchronization information, and the trusted device receiving the synchronization information fulfills update of the synchronization information.

Preferably, the step of the central node sending synchronization information to the trusted device which needs to update the synchronization information when the information of the trusted device in the trusted environment is updated, and the trusted device receiving the synchronization information fulfilling the update of the synchronization information comprises:

after a new trusted device is added to the trusted environment, the central node completing authentication with the newly added trusted device, and after the authentication is successful, the central node sending to the newly added trusted device the synchronization information comprising device name, device address, device type of the original trusted device in the trusted environment, as well as a link key to the central node, the newly added trusted device that receives the synchronization information locally establishing a trusted device list, calculating link keys to all trusted devices and storing the link keys to a local security authentication library, the newly added trusted device further feeding a success signal back to the central node, and the central node modifying a synchronization status of the newly added device to be updated after receiving the success signal;

after the original trusted device in the trusted environment enters into communication range, the central node further sending to the original trusted device the synchronization information comprising device name, address, device type of the newly added trusted device, as well as the link key to the central node, the original trusted device receiving the synchronization information adding the information of the newly added trusted device into the local trusted device list, calculating the link key to the newly added trusted device and storing the link key in the local security authentication library.

Preferably, the step of the central node sending synchronization information to the trusted device which needs to update the synchronization information when the information of the trusted device in the trusted environment is updated, and the trusted device receiving the synchronization information fulfilling the update of the synchronization information comprises: after the central node deletes a trusted device in the trusted environment, when the remaining trusted devices in the trusted environment enter into the communication range, the central node sending to the remaining trusted devices in the trusted environment the synchronization information comprising device names, addresses and device types of the remaining trusted devices, as well as the link keys to the central node, the trusted devices receiving the synchronization information deleting the information of the trusted device that has been deleted from the local trusted device list, and deleting the link key to the trusted device that has been deleted from the local security authentication library.

Preferably, the step of the central node sending synchronization information to the trusted device which needs to update the synchronization information when the information of the trusted device in the trusted environment is updated, and the trusted device receiving the synchronization information fulfilling the update of the synchronization information comprises: when the central node changes authentication policy of a trusted device, after the central node completes the authentication with the trusted device whose authentication policy is changed, the central node sends to the trusted device whose authentication policy is changed the synchronization information comprising the link key between the central node and the trusted device whose authentication policy is changed, and after receiving the synchronization information, the trusted device whose authentication policy is changed re-calculating the link keys to all of other trusted devices, and storing the link keys to all of other trusted devices into the local security authentication library, the newly added trusted device further feeding a success signal back to the central node;

the central node further sending to other trusted devices in the trusted environment the synchronization information comprising device name, address, device type of the trusted device whose authentication policy is changed, as well as the link key to the central node, the trusted device receiving the synchronization information re-calculating the link key to the trusted device whose authentication policy is changed, and stores the recalculated link key in the local security authentication library.

Preferably, the step of the central node sending synchronization information to the trusted device which needs to update the synchronization information when the information of the trusted device in the trusted environment is updated, and the trusted device receiving the synchronization information fulfilling the update of the synchronization information comprises:

when a trusted device in the trusted environment migrates to another trusted environment, the central node in the target trusted environment sending to the central node in the source trusted environment a change request comprising device names, addresses and device types of all the trusted devices in the target trust environment, as well as the link keys to the central node in the target trusted environment, after receiving the change request, the central node in the source trusted environment calculating the link key between the migrated device and each trusted device in the target trusted environment according to the link key between the central node in the source trusted environment and the central node in the target trusted environment and the link keys between the central node and each trusted device in the target trusted environment, the central node in the source trusted environment sends to the migrated device the synchronization information comprising device name, address and device type of each trusted device in the target trusted environment as well as the link key to the migrated device, after receiving the synchronization information, the migrated device storing the link key to each trusted device in the target trusted environment into the local security authentication library;

when a trusted device in the target trusted environment enters into the communication range, the central node in the target trusted environment sending to the trusted device entering into the communication range the synchronization information comprising device name, address and device type of the moving trusted device, as well as the link key to the trusted device, the trusted device receiving the synchronization information storing the link key to the migrated device in the local security authentication library.

In order to solve the aforementioned technical problem, the present invention provides a system for quick authentication between Bluetooth devices, and the system comprises one or more trusted environments, each trusted environment comprises a central node and one or more trusted devices;

the central node is set to: complete authentication with each trusted device in the trusted environment and store an information list including information of each trusted device, and when the information of a trusted device in the trusted environment is updated, send synchronization information to the trusted device that needs to update the synchronization information;

the trusted device is set to: complete the authentication with the central node, and after receiving the synchronization information sent from the central node, fulfill update of the synchronization information.

Preferably, the central node is set to: when a trusted device is added to the trusted environment, complete the authentication with the newly added trusted device, and after the authentication is successful, send to the newly added trusted device synchronization information comprising device names, addresses and device types of original trusted devices, as well as link keys to the central node; and, after an original trusted device in the trusted environment enters into a communication range, send the synchronization information to the original trusted device, and the synchronization information comprises the device name, address and device type of the newly added trusted device, as well as the link key with the central node;

the trusted device is set to:

when being the newly added trusted device, after receiving the synchronization information, locally establish a trusted device list, and calculate the link key to each trusted device and store the link key to a local security authentication library;

when being the original trusted device, after receiving the synchronization information, add the information of the newly added trusted device into the local trusted device list, and calculate the link key to the newly added trusted device and store the link key into the local security authentication library.

Preferably, the central node is set to: when deleting a trusted device in the trusted environment, send the synchronization information to the remaining trusted devices in the trusted environment when the remaining trusted devices in the trusted environment enter into a communication range, and the synchronization information comprises the device names, addresses and device types of the remaining trusted devices, as well as the link keys to the central node;

the trusted device is set to: when being a remaining trusted device in the trusted environment, after receiving the synchronization information, delete the information of the trusted device that have been deleted from the local trusted device list, and delete the link key to the deleted trusted device from the local security authentication library.

Preferably, the central node is set to: when an authentication policy of one trusted device is changed, complete the authentication with the trusted device whose authentication policy is changed, and send to the trusted device whose authentication policy is changed the synchronization information comprising the link key between the central node and the trusted device whose authentication policy is changed; and is further set to: after other trusted device enters into the communication range, send the synchronization information to said other trusted device, and the synchronization information comprises the device name, address, and device type of the trusted device whose authentication policy is changed, as well as the link key to the central node;

the trusted device is set to:

when the trusted device is the trusted device whose authentication policy is changed, after receiving the synchronization information, recalculate the link key to each of the other trusted devices, and store the link key to each of the other trusted devices into the local security authentication library;

when the trusted device is any other trusted device except of the one whose authentication policy is changed, after receiving the synchronization information, re-calculate the link key to the trusted device whose authentication policy is changed, and store the recalculated link key into the local security authentication library.

Preferably, when a trusted device in the trusted environment migrates to another trusted environment, the central node is set to:

when the central node is the central node in the target trusted environment, send to the central node in the source trusted environment a change request comprising device names, addresses and device types of all the trusted devices in the target trust environment, as well as the link key to the central node in the target trusted environment; and, calculate the link key between the migrated device and each trusted device in the target trusted environment according to the link key between the central node in the source trusted environment and the central node in the target trusted environment and the link key between the central node and each trusted device in the target trusted environment, and after a trusted device in the target trusted environment enters into the communication range, send to the trusted device that enters into the communication range the synchronization information comprising device name, address, device type of the migrated trusted device, as well as the link key to the trusted device;

when the central node is the central node in the source trusted environment, after receiving the change request, calculate the link key between the migrated device and each trusted device in the target trusted environment according to the link key between the central node in the target trusted environment and the central node in the target trusted environment and the link key between the central node and each trusted device in the target trusted environment, and send to the migrated device the synchronization information comprising device name, address, device type of each trusted device in the target trusted environment, as well as the link key to the migrated device;

the trusted device is set to:

when the trusted device is in the target trusted environment, after receiving the synchronization information, store the link key to the migrated device into the local security authentication library;

when the trusted device is the migrated device, after receiving the synchronization information, store the link key to each trusted device in the target trusted environment into the local security authentication library.

In order to solve the aforementioned technical problem, the present invention provides a central node, and the central node comprises an authentication module and a synchronization module, wherein:

the authentication module is set to complete authentication with each trusted device in a trusted environment and store an information list containing information of each trusted device;

the synchronization module is set to: after the information of a trusted device in the trusted environment is updated, send synchronization information to the trusted device that needs to update the synchronization information.

Preferably, the authentication module is set to: when a trusted device is added to the trusted environment, complete the authentication with the newly added trusted device;

the synchronization module is set to: after the authentication module completes the authentication with the newly added trusted device successfully, send to the newly added trusted device the synchronization information comprising device names, addresses, and device types of the original trusted devices in the trusted environment, as well as the link key to the central node; and, after an original trusted device in the trusted environment enters into a communication range, send to the original trust device the synchronization information comprising device name, address and device type of the newly added trusted device as well as the link key to the central node.

Preferably, the synchronization module is set to: when a trusted device is deleted in the trusted environment, after the remaining trust devices in the trusted environment enter into the communication range, send to the remaining trusted devices in the trusted environment the synchronization information comprising device names, addresses, device types of the remaining trust devices, as well as the link keys to the central node.

Preferably, the authentication module is set to: when an authentication policy of a trusted device is changed, complete the authentication with the trusted device whose authentication policy is changed;

the synchronization module is set to: when the authentication module completes the authentication of the trusted device whose authentication policy is changed, send to the trusted device whose authentication policy is changed the synchronization information comprising the link key between the central node and the trusted device whose authentication policy is changed; and after other trusted device enters into the communication range, send to the other trusted devices the synchronization information comprising device name, address and device type of the trusted device whose authentication policy is changed, as well as the link key to the central node.

Preferably, the synchronization module is set to: when the trusted device in the trusted environment moves to another trusted environment and the central node is the central node in the target trusted environment, send to the central node in the source trusted environment a change request comprising device names, addresses and device types of all the trusted devices in the target trusted environment, as well as the link key to the central node in the target trusted environment; and, calculate the link key between the migrated device and each trusted device in the target trusted environment according to the link key between the central node in the source trusted environment and the central node in the target trusted environment and the link key between the central node and each trusted device in the target trusted environment, and when the trusted device in the target trusted environment enters into the communication range, send to the trusted device entering into the communication range the synchronization information comprising device name, address and device type of the migrated trusted device as well as the link key to the trusted device; when the central node is the central node in the source trusted environment, calculate the link key between the migrated device and each trusted device in the target trusted environment according to the link key between the central node in the target trusted environment and the central node in the target trusted environment and the link key between the central node and each trusted device in the target trusted environment, and send to the migrated device the synchronization information comprising device name, address, device type of each trusted device in the target information environment, as well as the link key to the migrated device.

In summary, the present invention provides a system and method for quick authentication between Bluetooth devices, by which the authentication process of the trusted Bluetooth devices is simplified, the quick authentication of the Bluetooth trusted group devices is achieved, and the security between the devices is ensured at the same time; with the central node, it is easy to implement unified management on the trusted Bluetooth devices and an enhanced security measure is provided.

PREFERRED EMBODIMENTS OF THE PRESENT INVENTION

By adding a central node in the trusted environment, the present invention achieves a method for quick authentication between Bluetooth devices in a trusted environment, and the method also takes the security into account. The central node in the present invention is a lightweight management center that maintains a trusted device list, configures the default authentication policy, and the authentication information can also be migrated between the central nodes to achieve the quick authentication process between a Bluetooth device managed by a central node and the device managed by another central node.

Figure 1:
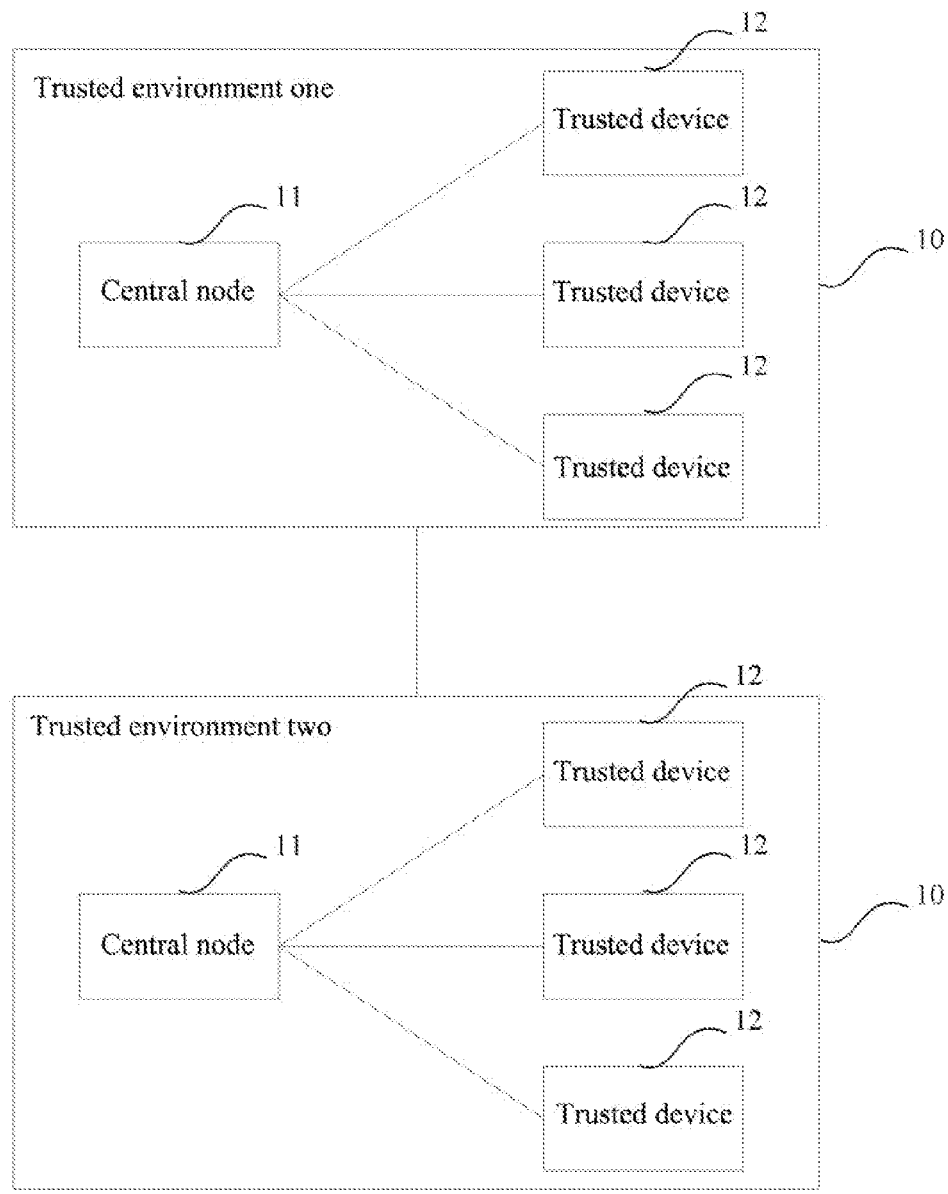
FIG. 1 is a typical topology in the trusted environment according to the present invention.

The present invention provides a system for quick authentication between Bluetooth devices, as shown in FIG. 1, the system comprises one or more trusted environments 10, each trusted environment 10 comprises the central node 11, and one or more trusted devices 12.

The central node 11 is set to: complete the authentication with each trusted device 12 in the trusted environment and store the information list containing the information of each trusted device; and, when the information of a trusted device in the trusted environment is updated, send the synchronization information to the trusted device 12 that needs to update the synchronization information.

The information of each trusted device comprises device name, address, device type of the trusted device, as well as the link key (also called the authentication code) to the central node 11; the aforementioned information list might also comprises a migration information list and a local authentication policy list, wherein, the migration information list comprises the information of all the trusted device migrating from other trusted environments to the local trusted environment as well as the information of all the trusted devices in the corresponding source trusted environment; and the information of the trusted devices moving from the local trusted environment to other trusted environments and the information of each trusted device in the corresponding target trusted environment; the local authentication policy list comprises the authentication policy between the central node and each trusted device.

The link key between each trusted device and the central node is defined through the authentication policy with any available method, such as key negotiation and so on. The algorithm for calculating the link key for each trusted device in the trusted environment is the same.

The trusted device 12 is set to: complete the update of the synchronization information after receiving the synchronization information, which is specifically as follows.

(A) When the central node 11 adds a trusted device 12 in the trusted environment, the central node 11 completes the authentication with the newly added trusted device 12, and sends the synchronization information to the newly added trusted device after the authentication is completed successfully, wherein, the synchronization information comprises device names, addresses, and device types of the original trusted devices in this trusted environment, and the link key to the central node 11; when the original trusted devices in the trusted environment enter into the communication range, the central node 11 also sends the synchronization information to the original trusted devices, and the synchronization information comprises device name, address and device type of the newly added trust device, as well as the link key to the central node 11.

After the newly added trusted device receives the synchronization information, it establishes a trusted device list locally, and calculates the link key with each trusted device and stores the link key to the Local Security Authentication Library.

After an original trusted device in the trusted environment receives the synchronization information, it adds the information of the newly added trusted device into the local trusted device list, and calculates the link key to the newly added trusted link and store the link key to the local security authentication library.

(B) When the central node 11 deletes a trusted device 12 in the trusted environment, if a remaining trusted device 12 in the trusted environment enters into the communication range, the central node 11 sends the synchronization information to the trusted devices 12, the synchronization information contains device name, address and device type of the remaining trusted device, and the link key to the central node.

After a remaining trusted device in the trusted environment receives the synchronization information, it deletes the information of the deleted trusted device in the local trusted device list, and deletes the link key to the deleted trusted device in the local security authentication library.

(C) When the central node 11 changes the authentication policy of a trusted device 12, the central node 11 completes the authentication of the trusted device whose authentication policy is changed, and sends the synchronization information to the trusted device whose authentication policy is changed, the synchronization information comprises the link key between the central node and the trusted device whose authentication policy is changed; after other trusted device enters into the communication range, the central node 11 also sends the synchronization information to the other trusted device, and the synchronization information contains device name, address, and device type of the trusted devices whose authentication policy is changed, as well as the link key to the central node.

After the trusted device whose authentication policy is changed receives the synchronization information, the trusted device recalculates the link keys to other trusted devices, and stores the link keys to other trusted devices into the local security authentication library.

After other trusted devices in the trusted environment receive the synchronization information, they recalculate the link keys to the trusted device whose authentication policy is changed, and store the link keys into the local security authentication libraries respectively.

(D) When a trusted device 12 in the trusted environment migrates to another trusted environment, the central node in the target trusted environment sends a change request to the central node in the source trusted environment, and the request comprises the device names, addresses and device types of all the trusted devices in the target trust environment, as well as the link key to the central node in the target trusted environment; and calculates the link key between the migrated device and each trusted device in the target trusted environment according to the link key between the central node in the source trusted environment and the central node in the target trusted environment, and the link key between the central node and each trusted device in the target trusted environment, and after a trusted device in the target trusted environment enters into the communication range, the synchronization information is sent to the trusted device that enters into the communication range, and the synchronization information comprises the device name, address and device type of the migrated trusted device, as well as the link key to this trusted device.

After the trusted device in the target information environment receives the synchronization information, the trusted device stores the link key with the moving device into the local security authentication library.

After the central node in the source trusted environment receives the change request, it calculates the link key between the migrated device and each trusted device in the target trusted environment according to the link key between the central node in the source trusted environment and the central node in the target trusted environment and the link key between the central node and each trusted device in the target trusted environment, and send the synchronization information to the migrated device, the synchronization information comprises the device name, address and device type of each trusted device in the target information environment, as well as the link key to the moving device.

After the migrated device receives the synchronization information, it stores the link key with each trusted device in the target trusted environment into the local security authentication library.

Figure 2:
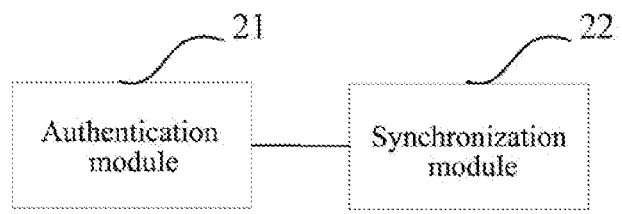
FIG. 2 is a schematic diagram of the constitution of the central node in an embodiment of the present invention.

The aforementioned central node, as shown in FIG. 2, comprises the authentication module 21 and the synchronization module 22, wherein:

the authentication module 21 is set to, complete the authentication with each trusted device in the trusted environment and store an information list containing the information of each trusted device;

the synchronization module 22 is set to: after the information of a trusted device in the trusted environment is updated, send synchronization information to the trusted device that needs to update the synchronization information.

The authentication module 21 may be further set to: when a trusted device is added to the trusted environment, complete the authentication with the newly added trusted device; the synchronization module 22 is set to: after the authentication module 21 completes the authentication with the newly added trusted successfully, send the synchronization information to the newly added trusted device, and the synchronization information comprises the device names, addresses and device types of the original trusted devices in the trusted environment, as well as the link key to the central node; and, after an original trusted device in the trusted environment enters into the communication range, it sends the synchronization information to the original trust devices, and the synchronization information comprises the device name, address and device type of the newly added trusted device as well as the link key to the central node.

The synchronization module 22 may be further set to: when a trusted device is deleted in the trusted environment, after the remaining trust devices in the trusted environment enter into the communication range, send the synchronization information to the remaining trusted devices in the trusted environment, and the synchronization information comprises the device names, addresses and device types of the remaining trust devices, as well as the link keys to the central node.

The authentication module 21 is also set to: when an authentication policy of a trusted device is changed, complete the authentication with the trusted device whose authentication policy is changed; the synchronization module 22 is also set to: when the authentication module 21 completes the authentication of the trusted device whose authentication policy is changed, send the synchronization information to the trusted device whose authentication policy is changed, and the synchronization information contains the link key between the central node and the trusted device whose authentication policy is changed; and after another trusted device enters into the communication range, it sends synchronization information to this trusted device, and the synchronization information comprise the device name, address and device type of the trusted device whose authentication policy changes, as well as the link key to the central node.

The synchronization module 22 is also set to: when a trusted device in the trusted environment moves to another trusted environment, when the central node is the central node in the source trusted environment, send a change request to the central node in the source trusted environment, and the request contains the device names, addresses and device types of all the trusted devices in the target trusted environment, as well as the link key to the central node in the target trusted environment; and, calculate the link key between the migrated device and each trusted device in the target trusted environment according to the link key between the central node in the source trusted environment and the central node in the target trusted environment and the link key between the central node and each trusted device in the target trusted environment, and when the trusted device in the target trusted environment enters into the communication range, send to the trusted device entering into the communication range the synchronization information comprising the device name, address and device type of the migrated trusted device as well as the link key to this trusted device; when the central node is the central node in the source trusted environment, calculate the link key between the migrated device and each trusted device in the target trusted environment according to the link key between the central node in the source trusted environment and the central node in the target trusted environment and the link key between the central node and each trusted device in the target trusted environment after the change request is received, and after the trusted device in the target trusted environment enters into the communication range, and send to the migrated trusted device the synchronization information comprising device name, address, device type of each trusted device in the target information environment, as well as the link key to this migrated device.

The present invention also provides a method for quick authentication between Bluetooth devices, and adds a central node in the trusted environment of the Bluetooth devices, wherein, the central node completes the authentication of each trusted device in the trusted environment and stores the information list containing the information of each trusted device, and after the information of a trusted device in the trusted environment is updated, the central node sends the synchronization information to the trusted device that needs to update the synchronization information, and the trusted device receiving the synchronization information completes the update of the synchronization information.

The information of each trusted device comprises device name, address, device type of the trusted device, as well as the link key (also called the authentication code) to the central node 11; the aforementioned information list might also comprises a migration information list and a local authentication policy list, wherein, the migration information list comprises the information of all the trusted device migrating from other trusted environments to the local trusted environment as well as the information of all the trusted devices in the corresponding source trusted environment; and the information of the trusted devices moving from the local trusted environment to other trusted environments and the information of each trusted device in the corresponding target trusted environment; the local authentication policy list comprises the authentication policy between the central node and each trusted device.

The present invention is described below in further detail from all angles by taking each individual event happened in the actual operating process as the scenario. These scenarios comprise adding a new trusted device, deleting a trusted device, migrating a trusted device to another trusted environment, changing the authentication policy, and information synchronization between the trusted devices, and so on.

EXAMPLE ONE

Figure 3:
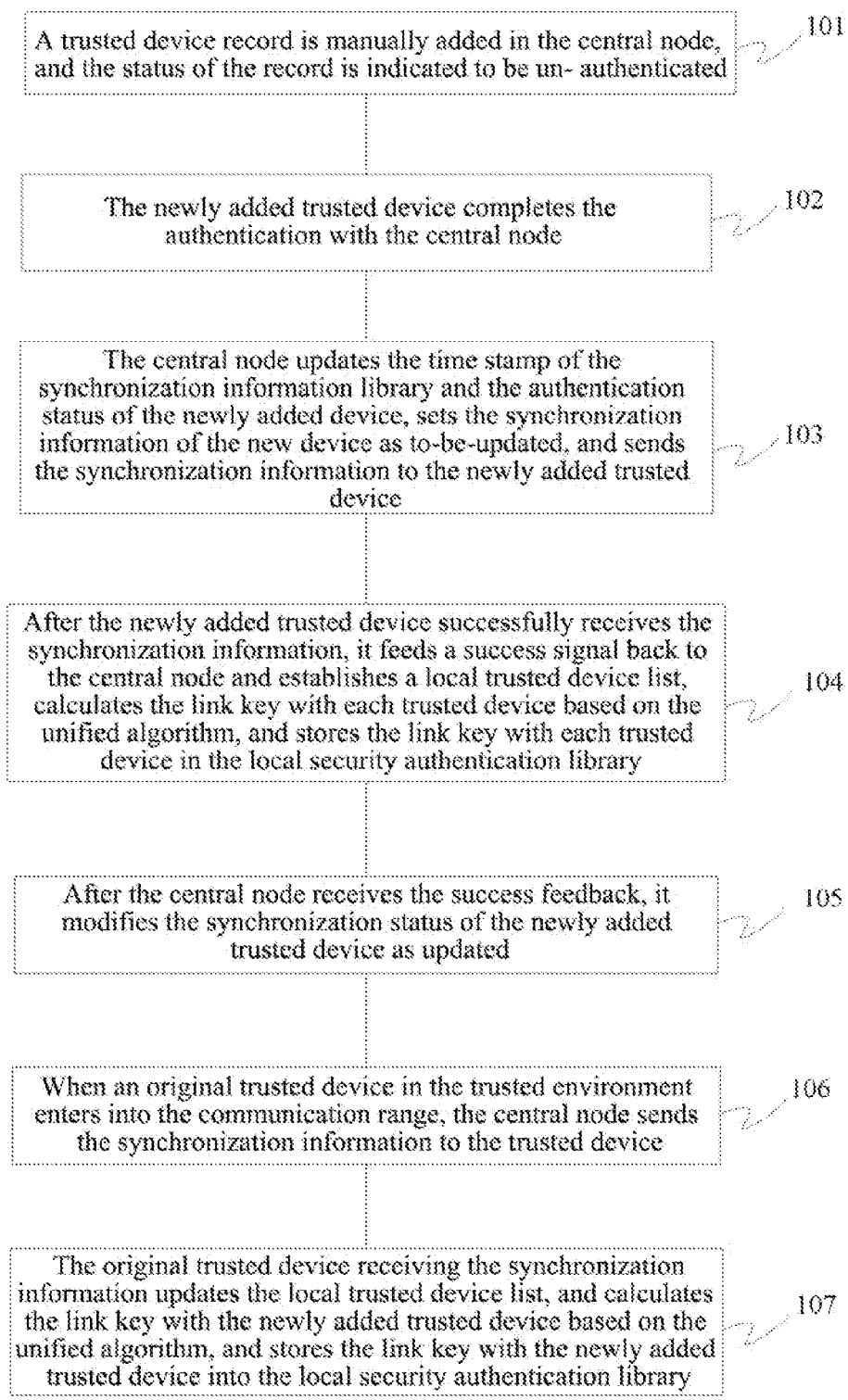
FIG. 3 is a flow chart of the example one of the present invention.

This example is adding a new trusted device in the trusted environment, as shown in FIG. 3.

In step 101, a trusted device record is manually added in the central node, and the status of the record is indicated to be un-authenticated.

In step 102, after the newly added trusted device or the central node detects a new device, it actively initiates an authentication process, and the authentication key is defined according to the default authentication policy.

In step 103, after the authentication is successful, the central node updates the time stamp of the synchronization information library and the authentication status of the newly added device, sets the synchronization information of the new device as to-be-updated, and sends the synchronization information to the newly added trusted device.

The synchronization information comprises the device names, addresses and device types of the original trusted devices in the trusted environment, and the link keys to the central node.

In step 104: after the newly added trusted device successfully receives the synchronization information, it feeds a success signal back to the central node and establishes a local trusted device list. The local trusted device list comprises the device name, address and device type of each trusted device, the link keys between the trusted devices and the central node, and so on; the newly added trusted device also calculates the link key to each trusted device based on the unified algorithm, and stores the link key to each trusted device in the local security authentication library.

In step 105, after the central node receives the success feedback, it modifies the synchronization status of the newly added trusted device as updated.

In step 106, when an original trusted device in the trusted environment enters into the communication range, the central node sends the synchronization information to the trusted device, and the synchronization information contains the device name, address and device type of the newly added trusted device, the link key with the central node, and so on.

In step 107, the original trusted device receiving the synchronization information updates the local trusted device list, that is, adding the synchronization information of the newly added trusted device in the local trusted device list, and calculates the link key to the newly added trusted device based on the unified algorithm, and stores the link key with the newly added trusted device into the local security authentication library; thus, each trusted device in the trusted environment can use the link keys between the trusted devices to communicate securely.

EXAMPLE TWO

Figure 4:
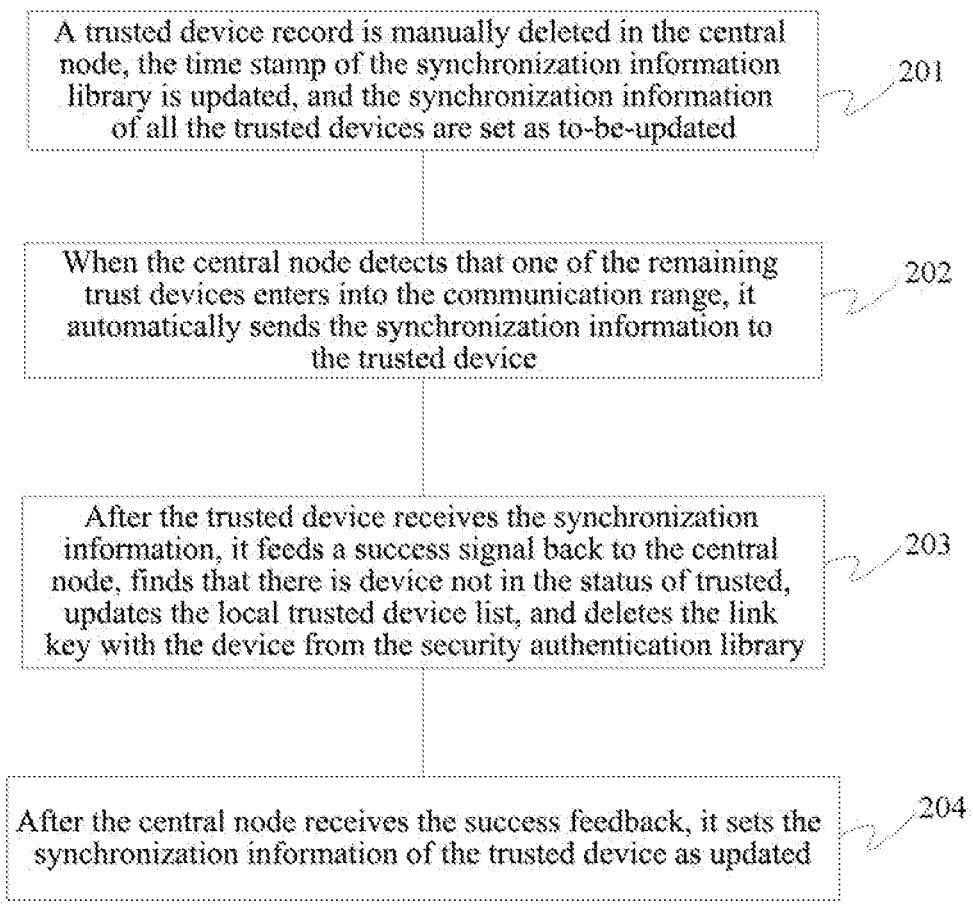
FIG. 4 is a flow chart of the example two of the present invention.

This example is deleting a trusted device from the trusted environment, as shown in FIG. 4.

In step 201: a trusted device record is manually deleted in the central node, that is, deleting the synchronization information of this device, and the time stamp of the synchronization information library is updated, and the synchronization information of all the trusted devices are set as to-be-updated.

In step 202: when the central node detects that one of the remaining trust devices enters into the communication range, the central node automatically sends the synchronization information to the trusted device; the synchronization information is the information of all the trusted devices but the deleted one, and the communication range is the distance between the trusted device and the central node.

In step 203: after the trusted device receives the synchronization information, it feeds a success signal back to the central node, compares the local trusted device list and finds that there is a device not in the status of trusted, updates the local trusted device list, that is, deleting the synchronization information of the device from the local trusted device list, and deleting the link key to the device from the security authentication library.

In step 204: after the central node receives the success feedback, it sets the synchronization information of the trusted device as updated.

Processes of steps 202 to 204 are performed on other trusted devices, till the synchronization information of all the trusted devices is updated.

EXAMPLE THREE

Figure 5:
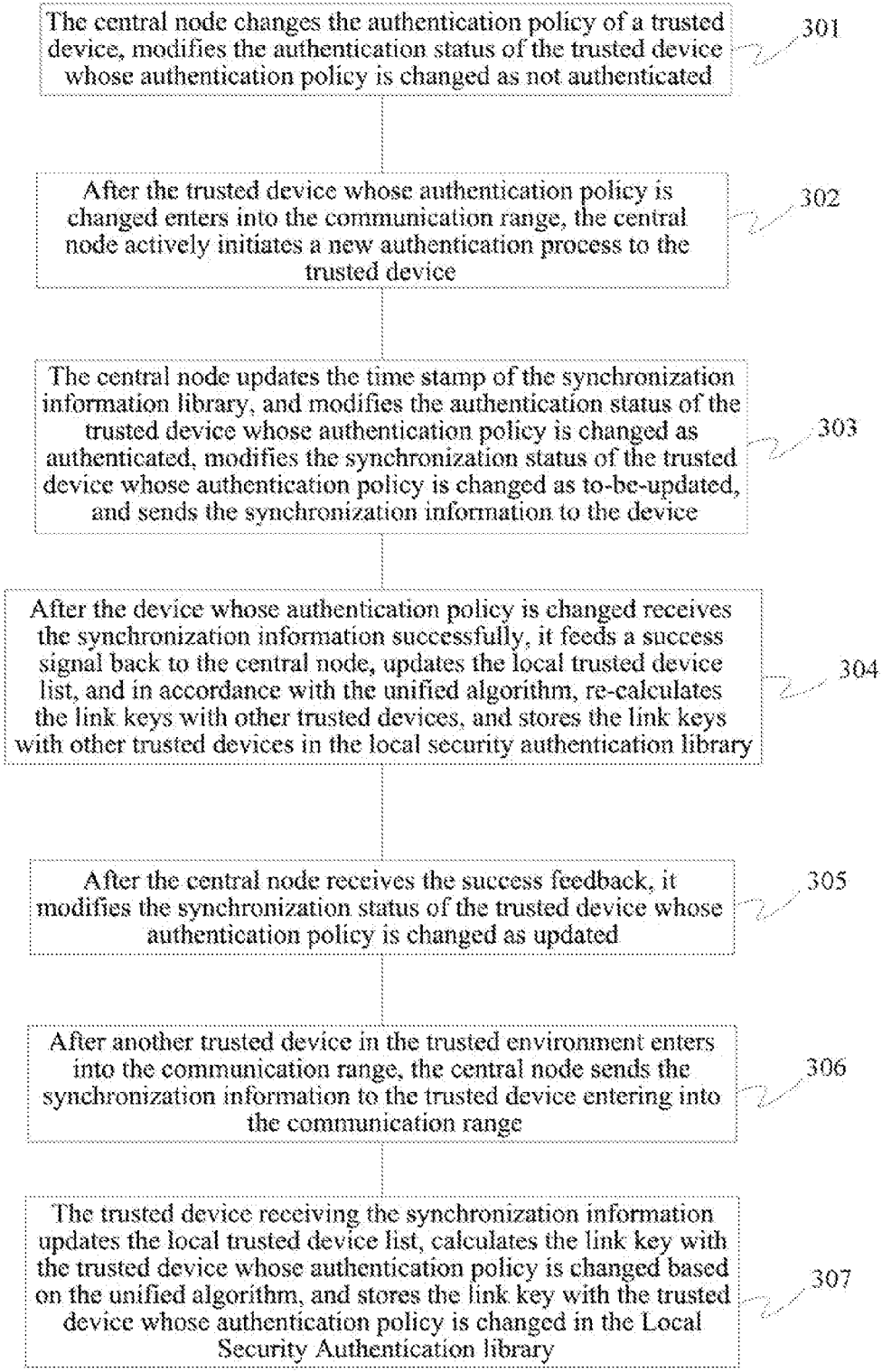
FIG. 5 is a flow chart of the example three of the present invention.

This example is changing the authentication policy of a trusted device, as shown in FIG. 5.

In step 301: the central node changes the authentication policy of a trusted device, modifies the authentication status of the trusted device whose authentication policy is changed as not authenticated.

In step 302: after the trusted device whose authentication policy is changed enters into the communication range, the central node actively initiates a new authentication process to the trusted device.

In step 303: after the authentication is successful, the central node updates the time stamp of the synchronization information library, and modifies the authentication status of the trusted device whose authentication policy is changed as authenticated, modifies the synchronization status of the trusted device whose authentication policy is changed as to-be-updated, and sends the synchronization information to the device, wherein, the synchronization information comprises the link key between the central node and the trusted device whose authentication policy is changed.

In step 304: after the device whose authentication policy is changed receives the synchronization information successfully, it feeds a success signal back to the central node, updates the local trusted device list, and re-calculates the link keys to other trusted devices in accordance with the unified algorithm, and stores the link keys to other trusted devices in the local security authentication library.

In step 305: after the central node receives the success feedback, the central node modifies the synchronization status of the trusted device whose authentication policy is changed as updated.

In step 306: after another trusted device in the trusted environment enters into the communication range, the central node sends the synchronization information to the trusted device entering into the communication range, and the synchronization information contains the device name, address and device type of the trusted device whose authentication policy is changed, the link key to the central node, and so on.

In step 307: the trusted device receiving the synchronization information updates the local trusted device list, that is, modifying the relevant information of the trusted device whose authentication policy is changed, also calculates the link key to the trusted device whose authentication policy is changed based on the unified algorithm, and stores the link key to the trusted device whose authentication policy is changed in the Local Security Authentication library.

EXAMPLE FOUR

Figure 6:
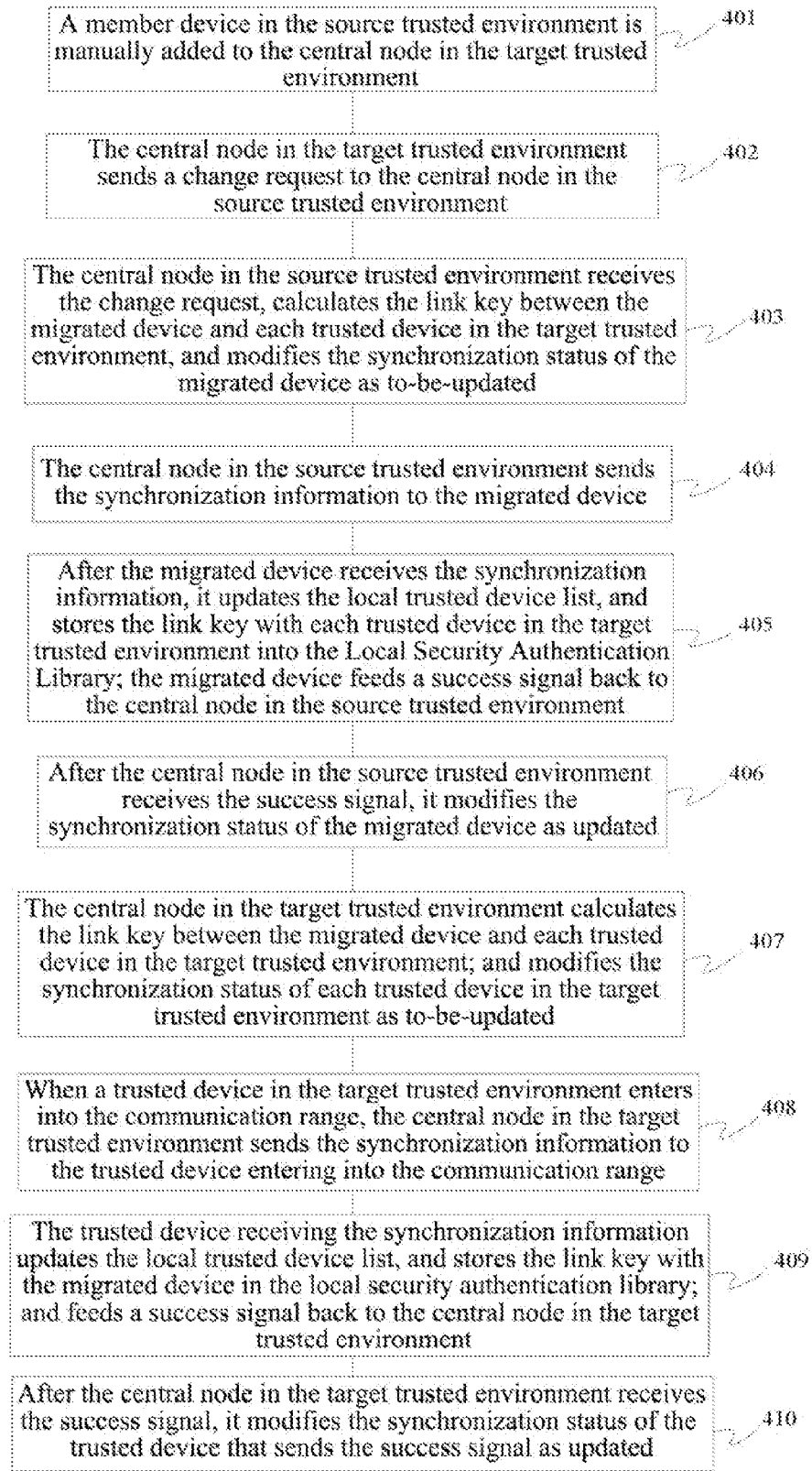
FIG. 6 is a flow chart of the example four of the present invention.

This example is to migrate a trusted device from the source trusted environment to another trusted environment, as shown in FIG. 6.

In step 401: a member device in the source trusted environment is manually added to the central node in the target trusted environment, the added relevant information comprises the device name, address and device type of the device, the link key to the central device in the source trusted environment, and the address of the home central node, and it is marked that its authentication status is un-authenticated, meanwhile, the central node needs to ensure that the newly added member device is not an existing member in the target trusted environment.

In step 402: the central node in the target trusted environment sends a change request to the central node in the source trusted environment, and the request comprises the synchronization information of all the devices in the target trusted environment, and the synchronization information comprises the device names, addresses and device types of the trusted devices, the link keys with the central node in the target trusted environment, and so on.

In step 403: after the central node in the source trusted environment receives the change request, the central node calculates the link key between the moving device and each trusted device in the target trusted environment according to the link key between the central node in the source trusted environment and the central node in the target trusted environment, and the link key between the central node and each trusted device in the target trusted environment, and modifies the synchronization status of the moving device as to-be-updated.

In step 404: the central node in the source trusted environment sends the synchronization information to the moving device, and the synchronization information comprises the relevant information of each trusted device in the target trusted environment, wherein, the relevant information comprises the device name, address and device type of the trusted device, the link key with this moving device, and so on.

In step 405: after the migrated device receives the synchronization information, it updates the local trusted device list, that is, adding the relevant information of each trusted device in the target trusted environment into the local trusted device list, and stores the link key to each trusted device in the target trusted environment into the Local Security Authentication Library; the moving device feeds a success signal back to the central node in the source trusted environment.

In step 406: after the central node in the source trusted environment receives the success signal, it modifies the synchronization status of the migrated device as updated.

In step 407: the central node in the target trusted environment calculates the link key between the migrated device and each trusted device in the target trusted environment according to the link key between the central node in the source trusted environment and the central node in the target trusted environment, and the link key between the central node in the target trusted environment and each trusted device in the target trusted environment; modifies the synchronization status of each trusted device in the target trusted environment as to-be-updated.

In step 408: when a trusted device in the target trusted environment enters into the communication range, the central node in the target trusted environment sends the synchronization information to the trusted device entering into the communication range, and the synchronization information comprises the device name, address and device type of the moving trusted device, the link key with the trusted device, and so on.

In step 409: the trusted device receiving the synchronization information updates the local trusted device list, that is, adding the relevant information of the migrated device into the local trusted device list, and the relevant information of the migrated device comprises the device name, address and device type, and link key to the trusted device; the trusted device also stores the link key to the migrated device in the local security authentication library; and feeds a success signal back to the central node in the target trusted environment.

In step 410: after the central node in the target trusted environment receives the success signal, it modifies the synchronization status of the trusted device that sends the success signal as updated.

The algorithms for calculating the link key used by the source trusted environment and the target trusted environment for the migration are the same.

The present invention guarantees the information reunification of the trust devices based on the update time. The present invention does not reject the independent authentication process of each trusted device with other devices, but the priority of the authentication information between the trusted devices independently is lower than the authentication information synchronized by the central node, and is automatically overwritten after receiving the synchronization information of the central node. By deleting a trusted device and publishing the updated authentication information, the central node also excludes a device out of the trusted environment. The central node might also change the authentication policy and actively initiate a re-authentication process with each device, and achieve the function of updating the authentication information. One central node manages a trusted environment, and the central node in the trusted relationship can also complete the authentication, and forms a larger trusted network, the devices in a trusted environment (hereinafter referred to as the source trusted environment) can be configured to become members in another trusted environment (hereinafter referred to as the target trusted environment).

It can be seen from the specification that the authentication of the Bluetooth devices is performed based on link key, as long as the authenticator and the applicant hold the same link key, the device authentication can be completed successfully to acquire the access right of the peer party. The link key is a 128-bit data string that is calculated on the basis of a 128 bit random number. The synchronization information sent by the central node to each device comprises the device names, addresses, device types and link keys in the trusted device list. After each device receives the synchronization information, it establishes a local trusted device list and stores the device information in the security authentication library (the method for operating the security authentication library is provided by the Bluetooth chip suppliers).

The method for synchronizing information between the trusted devices is that: first, the central node cyclically searches the devices to find the available devices, then determines whether to initiate an authentication process or not and whether to send the latest synchronization information or not according to the device address, the maintained authentication status of the trusted device, synchronization status, and so on.

In practical applications, more devices in the trusted environment, more simplification can be got. The method for synchronizing information between the devices might be point-to-point connection, and the broadcast means might also be used to complete; the central node might regularly synchronize to all the trusted members, or each trusted node regularly or randomly requests the central node for synchronization; the Bluetooth wireless connection, or other connection methods including the wired connection might be used between the central nodes.

There are a lot of Bluetooth chip manufacturers, wherein the Bluetooth chips from the CSR company are very widely used. In the following, taking the BlueCore Series Bluetooth chips from the CSR for example to illustrate how to add device information to the remote device database after acquiring the relevant information of other Bluetooth devices through information synchronization.

The CSR Company provides a set of Bluetooth host software protocol stacks for this series of chips to achieve the HCI (Host Controller Interface), L2CAP (Logical Link Control and Adaptation Protocol), RFCOMM (serial linear simulation Protocol), SDP (Service Discovery Protocol), and even higher level Bluetooth protocol stack, thus providing a good foundation platform for the development of Bluetooth applications. Wherein, in the security-related API (Application Program Interface), a series of interface functions are provided for managing the device information in the nonvolatile memory. After a Bluetooth device acquires information such as the Bluetooth device address, device type, device name, and link key of other devices through information synchronization, correspondingly fills the information into the device record type structure, and call the write-in interface function to write the device recode into the device database, thus the work of adding the device is achieved and the purpose of establishing the trusted relationship without the authentication process is realized.

Although the present invention is described with combination of specific embodiments, but for those skilled in the field, without departing from the spirit and essence of the present invention, the present invention can be modified or changed. These modifications and variations should be considered in the scope of the claims of the present invention.

Industrial Applicability

The present invention provides a system and method for quick authentication between Bluetooth devices, by which the authentication process of the trusted Bluetooth devices is simplified, the quick authentication of the Bluetooth trusted group devices is achieved, and meanwhile the security between the devices is ensured; with the central node, it is easy to implement unified management on the trust Bluetooth devices and an enhanced security measure is provided.

What is claimed is:

1. A method for quick authentication between Bluetooth devices, comprising:
    adding a central node in a trusted environment of Bluetooth devices, wherein, authentication is completed between the central node and each trusted device in the trusted environment and the central node stores an information list including information of each trusted device, when the information of the trusted device in the trusted environment is updated, the central node needs to send synchronization information to the trusted device which needs to update the synchronization information, and the trusted device receiving the synchronization information fulfills update of the synchronization information.

2. The method of claim 1, wherein,
    the step of the central node sending synchronization information to the trusted device which needs to update the synchronization information when the information of the trusted device in the trusted environment is updated, and the trusted device receiving the synchronization information fulfilling the update of the synchronization information comprises:
    after a new trusted device is added to the trusted environment, the central node completing authentication with the newly added trusted device, and after the authentication is successful, the central node sending to the newly added trusted device the synchronization information comprising device name, device address, device type of the original trusted device in the trusted environment, as well as a link key to the central node, the newly added trusted device that receives the synchronization information locally establishing a trusted device list, calculating link keys to all trusted devices and storing the link keys to a local security authentication library, the newly added trusted device further feeding a success signal back to the central node, and the central node modifying a synchronization status of the newly added device to be updated after receiving the success signal;
    after the original trusted device in the trusted environment enters into communication range, the central node further sending to the original trusted device the synchronization information comprising device name, address, device type of the newly added trusted device, as well as the link key to the central node, the original trusted device receiving the synchronization information adding the information of the newly added trusted device into the local trusted device list, calculating the link key to the newly added trusted device and storing the link key in the local security authentication library.

3. The method of claim 1, wherein:
    the step of the central node sending synchronization information to the trusted device which needs to update the synchronization information when the information of the trusted device in the trusted environment is updated, and the trusted device receiving the synchronization information fulfilling the update of the synchronization information comprises: after the central node deletes a trusted device in the trusted environment, when the remaining trusted devices in the trusted environment enter into the communication range, the central node sending to the remaining trusted devices in the trusted environment the synchronization information comprising device names, addresses and device types of the remaining trusted devices, as well as the link keys to the central node, the trusted devices receiving the synchronization information deleting the information of the trusted device that has been deleted from the local trusted device list, and deleting the link key to the trusted device that has been deleted from the local security authentication library.

4. The method of claim 1, wherein:
    the step of the central node sending synchronization information to the trusted device which needs to update the synchronization information when the information of the trusted device in the trusted environment is updated, and the trusted device receiving the synchronization information fulfilling the update of the synchronization information comprises: when the central node changes authentication policy of a trusted device, after the central node completes the authentication with the trusted device whose authentication policy is changed, the central node sends to the trusted device whose authentication policy is changed the synchronization information comprising the link key between the central node and the trusted device whose authentication policy is changed, and after receiving the synchronization information, the trusted device whose authentication policy is changed re-calculating the link keys to all of other trusted devices, and storing the link keys to all of other trusted devices into the local security authentication library, the newly added trusted device further feeding a success signal back to the central node;
    the central node further sending to other trusted devices in the trusted environment the synchronization information comprising device name, address, device type of the trusted device whose authentication policy is changed, as well as the link key to the central node, the trusted device receiving the synchronization information re-calculating the link key to the trusted device whose authentication policy is changed, and stores the recalculated link key in the local security authentication library.

5. The method of claim 1, wherein, the step of the central node sending synchronization information to the trusted device which needs to update the synchronization information when the information of the trusted device in the trusted environment is updated, and the trusted device receiving the synchronization information fulfilling the update of the synchronization information comprises:

when a trusted device in the trusted environment migrates to another trusted environment, the central node in the target trusted environment sending to the central node in the source trusted environment a change request comprising device names, addresses and device types of all the trusted devices in the target trust environment, as well as the link keys to the central node in the target trusted environment, after receiving the change request, the central node in the source trusted environment calculating the link key between the migrated device and each trusted device in the target trusted environment according to the link key between the central node in the source trusted environment and the central node in the target trusted environment and the link keys between the central node and each trusted device in the target trusted environment, the central node in the source trusted environment sends to the migrated device the synchronization information comprising device name, address and device type of each trusted device in the target trusted environment as well as the link key to the migrated device, after receiving the synchronization information, the migrated device storing the link key to each trusted device in the target trusted environment into the local security authentication library;

when a trusted device in the target trusted environment enters into the communication range, the central node in the target trusted environment sending to the trusted device entering into the communication range the synchronization information comprising device name, address and device type of the moving trusted device, as well as the link key to the trusted device, the trusted device receiving the synchronization information storing the link key to the migrated device in the local security authentication library.

6. A system for quick authentication between Bluetooth devices, wherein, the system comprises one or more trusted environments, each trusted environment comprises a central node and one or more trusted devices;

the central node is set to: complete authentication with each trusted device in the trusted environment and store an information list including information of each trusted device, and when the information of a trusted device in the trusted environment is updated, send synchronization information to the trusted device that needs to update the synchronization information;

the trusted device is set to: complete the authentication with the central node, and after receiving the synchronization information sent from the central node, fulfill update of the synchronization information.

7. The system of claim 6, wherein:

the central node is set to: when a trusted device is added to the trusted environment, complete the authentication with the newly added trusted device, and after the authentication is successful, send to the newly added trusted device synchronization information comprising device names, addresses and device types of original trusted devices, as well as link keys to the central node; and, after an original trusted device in the trusted environment enters into a communication range, send the synchronization information to the original trusted device, and the synchronization information comprises the device name, address and device type of the newly added trusted device, as well as the link key with the central node;

the trusted device is set to:

when being the newly added trusted device, after receiving the synchronization information, locally establish a trusted device list, and calculate the link key to each trusted device and store the link key to a local security authentication library;

when being the original trusted device, after receiving the synchronization information, add the information of the newly added trusted device into the local trusted device list, and calculate the link key to the newly added trusted device and store the link key into the local security authentication library.

8. The system of claim 6, wherein:

the central node is set to: when deleting a trusted device in the trusted environment, send the synchronization information to the remaining trusted devices in the trusted environment when the remaining trusted devices in the trusted environment enter into a communication range, and the synchronization information comprises the device names, addresses and device types of the remaining trusted devices, as well as the link keys to the central node;

the trusted device is set to: when being a remaining trusted device in the trusted environment, after receiving the synchronization information, delete the information of the trusted device that have been deleted from the local trusted device list, and delete the link key to the deleted trusted device from the local security authentication library.

9. The system of claim 6, wherein:

the central node is set to: when an authentication policy of one trusted device is changed, complete the authentication with the trusted device whose authentication policy is changed, and send to the trusted device whose authentication policy is changed the synchronization information comprising the link key between the central node and the trusted device whose authentication policy is changed; and is further set to: after other trusted device enters into the communication range, send the synchronization information to said other trusted device, and the synchronization information comprises the device name, address, and device type of the trusted device whose authentication policy is changed, as well as the link key to the central node;

the trusted device is set to:

when the trusted device is the trusted device whose authentication policy is changed, after receiving the synchronization information, recalculate the link key to each of the other trusted devices, and store the link key to each of the other trusted devices into the local security authentication library;

when the trusted device is any other trusted device except of the one whose authentication policy is changed, after receiving the synchronization information, re-calculate the link key to the trusted device whose authentication policy is changed, and store the recalculated link key into the local security authentication library.

10. The system of claim 6, wherein:
when a trusted device in the trusted environment migrates to another trusted environment,
the central node is set to:
when the central node is the central node in the target trusted environment, send to the central node in the source trusted environment a change request comprising device names, addresses and device types of all the trusted devices in the target trust environment, as well as the link key to the central node in the target trusted environment; and, calculate the link key between the migrated device and each trusted device in the target trusted environment according to the link key between the central node in the source trusted environment and the central node in the target trusted environment and the link key between the central node and each trusted device in the target trusted environment, and after a trusted device in the target trusted environment enters into the communication range, send to the trusted device that enters into the communication range the synchronization information comprising device name, address, device type of the migrated trusted device, as well as the link key to the trusted device;
when the central node is the central node in the source trusted environment, after receiving the change request, calculate the link key between the migrated device and each trusted device in the target trusted environment according to the link key between the central node in the target trusted environment and the central node in the target trusted environment and the link key between the central node and each trusted device in the target trusted environment, and send to the migrated device the synchronization information comprising device name, address, device type of each trusted device in the target trusted environment, as well as the link key to the migrated device;
the trusted device is set to:
when the trusted device is in the target trusted environment, after receiving the synchronization information, store the link key to the migrated device into the local security authentication library;
when the trusted device is the migrated device, after receiving the synchronization information, store the link key to each trusted device in the target trusted environment into the local security authentication library.

11. A central node, comprising an authentication module and a synchronization module, wherein:
the authentication module is set to complete authentication with each trusted device in a trusted environment and store an information list containing information of each trusted device;
the synchronization module is set to: after the information of a trusted device in the trusted environment is updated, send synchronization information to the trusted device that needs to update the synchronization information.

12. The central node of claim 11, wherein:
the authentication module is set to: when a trusted device is added to the trusted environment, complete the authentication with the newly added trusted device;
the synchronization module is set to: after the authentication module completes the authentication with the newly added trusted device successfully, send to the newly added trusted device the synchronization information comprising device names, addresses, and device types of the original trusted devices in the trusted environment, as well as the link key to the central node; and, after an original trusted device in the trusted environment enters into a communication range, send to the original trust device the synchronization information comprising device name, address and device type of the newly added trusted device as well as the link key to the central node.

13. The central node of claim 11, wherein:
the synchronization module is set to: when a trusted device is deleted in the trusted environment, after the remaining trust devices in the trusted environment enter into the communication range, send to the remaining trusted devices in the trusted environment the synchronization information comprising device names, addresses, device types of the remaining trust devices, as well as the link keys to the central node.

14. The central node of claim 11, wherein:
the authentication module is set to: when an authentication policy of a trusted device is changed, complete the authentication with the trusted device whose authentication policy is changed;
the synchronization module is set to: when the authentication module completes the authentication of the trusted device whose authentication policy is changed, send to the trusted device whose authentication policy is changed the synchronization information comprising the link key between the central node and the trusted device whose authentication policy is changed; and after other trusted device enters into the communication range, send to the other trusted devices the synchronization information comprising device name, address and device type of the trusted device whose authentication policy is changed, as well as the link key to the central node.

15. The central node of claim 11, wherein:
the synchronization module is set to: when the trusted device in the trusted environment moves to another trusted environment and the central node is the central node in the target trusted environment, send to the central node in the source trusted environment a change request comprising device names, addresses and device types of all the trusted devices in the target trusted environment, as well as the link key to the central node in the target trusted environment; and, calculate the link key between the migrated device and each trusted device in the target trusted environment according to the link key between the central node in the source trusted environment and the central node in the target trusted environment and the link key between the central node and each trusted device in the target trusted environment, and when the trusted device in the target trusted environment enters into the communication range, send to the trusted device entering into the communication range the synchronization information comprising device name, address and device type of the migrated trusted device as well as the link key to the trusted device; when the central node is the central node in the source trusted environment, calculate the link key between the migrated device and each trusted device in the target trusted environment according to the link key between the central node in the target trusted environment and the central node in the target trusted environment and the link key between the central node and each trusted device in the target trusted environment, and send to the migrated device the synchronization information comprising device name, address, device type of each trusted device in the target information environment, as well as the link key to the migrated device.

* * * * *